United States Patent [19]

Rossi et al.

[11] Patent Number: 4,879,641
[45] Date of Patent: Nov. 7, 1989

[54] ANALOG MULTIPLEX FOR SENSING THE MAGNITUDE AND SENSE OF THE CURRENT THROUGH A H-BRIDGE STAGE UTILIZING A SINGLE SENSING RESISTANCE

[75] Inventors: Domenico Rossi, Cilavegna; Andrea Cuomo, Milano, both of Italy

[73] Assignee: SGS-Thomson Microelectronics S.R.L., Italy

[21] Appl. No.: 263,935

[22] Filed: Oct. 28, 1988

[30] Foreign Application Priority Data

Nov. 2, 1987 [IT] Italy ................................ 8366 A/87

[51] Int. Cl.$^4$ ............................................. H02M 3/24
[52] U.S. Cl. ....................................... 363/98; 363/58; 318/293; 318/599
[58] Field of Search ..................... 363/56, 58, 98, 132, 363/17, 136; 318/281, 287, 288, 289, 291, 293, 294, 599

[56] References Cited

U.S. PATENT DOCUMENTS

| | | | |
|---|---|---|---|
| 4,410,926 | 10/1983 | Hofner et al. | 363/58 X |
| 4,494,181 | 1/1985 | Ramlohr et al. | 318/293 X |
| 4,654,568 | 3/1987 | Mansmann | 318/287 X |
| 4,677,356 | 6/1987 | Tsuneda et al. | 318/293 X |
| 4,710,686 | 12/1987 | Guzik | 363/98 X |

FOREIGN PATENT DOCUMENTS 0135390 6/1986 Japan ................................ 318/293

Primary Examiner—Patrick R. Salce
Assistant Examiner—Kristine Peckman
Attorney, Agent, or Firm—Pollock, Vande Sande & Priddy

[57] ABSTRACT

A circuit for sensing the magnitude and sense of a current flowing through the load of an H-bridge stage driving the load in a switching mode by means of a clocked, square-wave driving signal and the inverted signal thereof applied, respectively, to two pairs of analog switches arranged in a bridge configuration and functionally switching the load between a supply node and a virtual ground node is made by utilizing a single sensing resistance connected between the virtual ground node and the real ground node of the circuit, the signal across the resistance and the inverted signal thereof are fed to two inputs of an analog multiplex whose output signal is fed to the input of a comparator in order to obtain at the output of the latter a signal with an amplitude proportional to the intensity of the current and a polarity determined by the polarity of a reference voltage which is applied to another input of the comparator. The PWM control loop may then be completed by means of a flip-flop to the inputs of which the output signal of the comparator and a clock signal are applicable in order to generate at the output of the flip-flop the clocked driving signal.

5 Claims, 3 Drawing Sheets

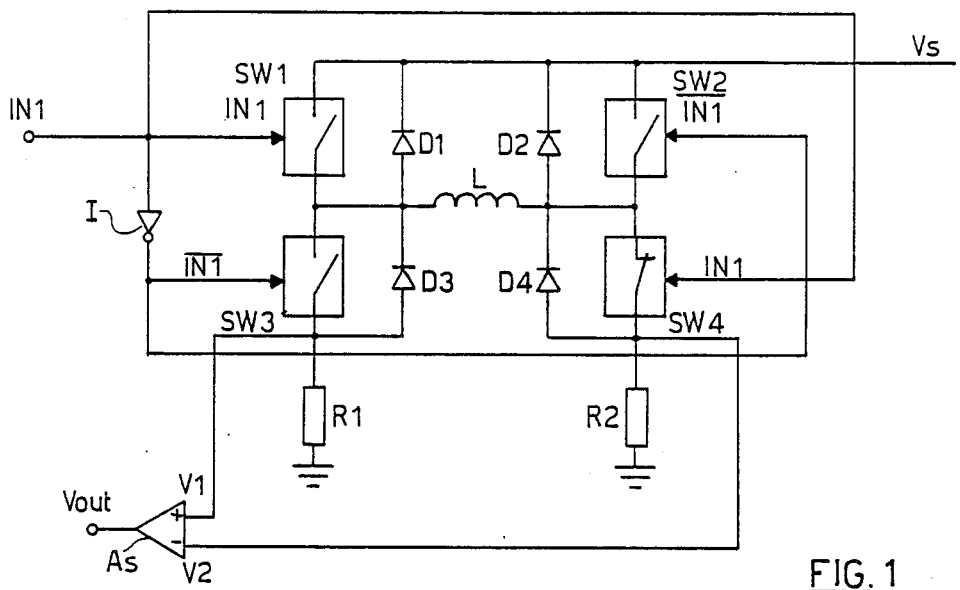
FIG. 1 (prior art)
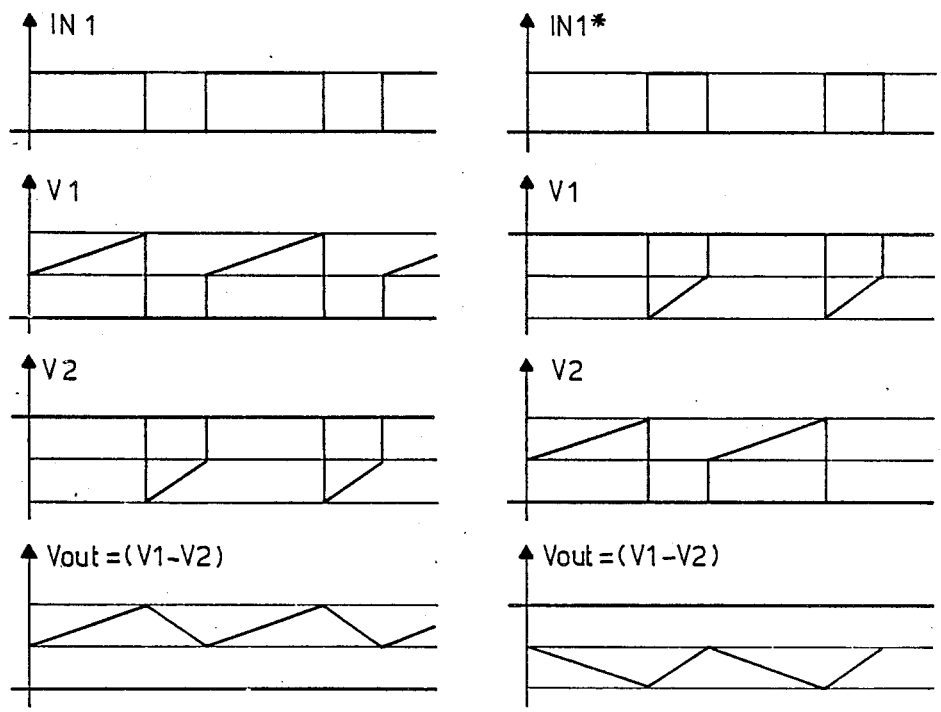
FIG. 2 (prior art)
FIG. 3 (prior art)

ANALOG MULTIPLEX FOR SENSING THE MAGNITUDE AND SENSE OF THE CURRENT THROUGH A H-BRIDGE STAGE UTILIZING A SINGLE SENSING RESISTANCE

BACKGROUND OF THE INVENTION

The present invention relates to circuits for a switching mode driving of a load and in particular to circuit arrangements for controlling the current being delivered to the load.

Apparatuses for controlling electric motors and more generally for delivering a current to inductive loads utilize the so-called Pulse Width Modulation technique (PWM). This technique is implemented by means of an "H-bridge" stage utilizing a square-wave driving signal, whose frequency and duty-cycle are controlled by means of a clock signal, and the inverted signal thereof which are applied, respectively, to two pairs of switches arranged in a bridge configuration and operatively switching the load between a supply and a ground or a virtual ground node of the bridge stage. For implementing a system for monitoring and controlling the current being delivered to the load, sensing resistances, connected between the virtual ground nodes of the two branches of the H-bridge stage and the real ground of the circuit are frequently used. These sensing resistors must necessarily be power components, suitable to withstand the current which flows through the load, and for this reason are almost exclusively discrete components, connected externally to an integrated driver circuit and generally representing a remarkable cost factor of the apparatus also because they must often possess well determined precision and temperature coefficient characteristics and be exempt of any appreciable inductance.

The circuit for sensing the magnitude and direction of the current according to the present invention determines the magnitude and direction of the current being delivered to a load of an H-bridge stage by utilizing a single sensing resistor connected between a common virtual ground node of the driving bridge circuit and a real ground node.

The different aspects and advantages of the invention in relation to the known technique will be more easily understood through the following description with reference to a series of drawings, wherein:

BRIEF DESCRIPTION OF THE DRAWINGS

FIG. 1 is a principal circuit diagram of an H-bridge stage provided with a circuit for sensing the magnitude and sense of the electric current flowing through the load, according to a known technique;

FIGS. 2 and 3 show two typical signal diagrams representative of the circuit of FIG. 1;

An H-bridge stage for driving an inductive load L is shown in FIG. 1 using conventional symbols. The stage is formed by four switches: SW1, SW4 and SW2, SW3; driven, repectively, by a driving signal IN1 and by the inverted signal thereof $\overline{IN1}$, the latter being obtained by means of an inverter I. For completeness's sake recirculation diodes D1, D4 and D2, D3 are also shown in FIG. 1. The two pairs of switches (namely SW1, SW4 and SW2, SW3) arranged in a bridge configuration functionally switch the load L between the supply node Vs, and virtual ground nodes, (which in the case shown in FIG. 1 coincide with the nodes (V1) and (V2), in function of a certain "duty cycle", which is in turn determined by the relative duration of the driving signals IN1 and $\overline{IN1}$ (in accordance with a Pulse Width Modulation technique).

The control of the driving of the load is based upon the sensing of the magnitude (modulus) and of the sense (direction) of the current flowing through the load L.

According to a widely used technique embodied in the circuit of FIG. 1, the sensing circuit employs two distinct sensing resistors R1 and R2 connected, respectively, between the two virtual ground nodes (V1) and (V2) of the H-bridge circuit and a real ground node of the circuit. The voltage signals across these two sensing resistors R1 and R2 (i.e. the potentials V1 and V2) are fed to the inputs of a differential sensing amplifier ($A_s$).

The representative signal diagrams of the circuit are shown in FIGS. 2 and 3. By supposing to operate with a "duty-cycle" of the input signal different from 50% and therefore to adjust the current through the load L (which is presumed inductive) to an average value different from the operating situation may be depicted by means of the time diagrams of FIG. 2 which represent a drive signal IN1 (having a certain duty-cycle), the voltages of the two virtual ground nodes, V1 and V2, and the output voltage of the differential amplifier $A_s$. In the case illustrated, the output signal of the amplifier will have a positive polarity and the amplitude of this signal (Vout) will be proportional to the magnitude of the current flowing through the load L.

Vice versa, by supposing to apply a driving signal IN1*, complementary to the driving signal IN1 of the situation depicted in the diagrams of FIG. 1, the corresponding signals will take the form depicted in the diagrams of FIG. 3. Basically the output signal of the amplifier $A_s$ will have the same amplitude but an inverted, negative polarity.

As easily recognized, according to such a sensing circuit of the prior art, the sensing of the direction of the current flowing through the load could not take place if only one sensing resistor is used.

Figure 4:
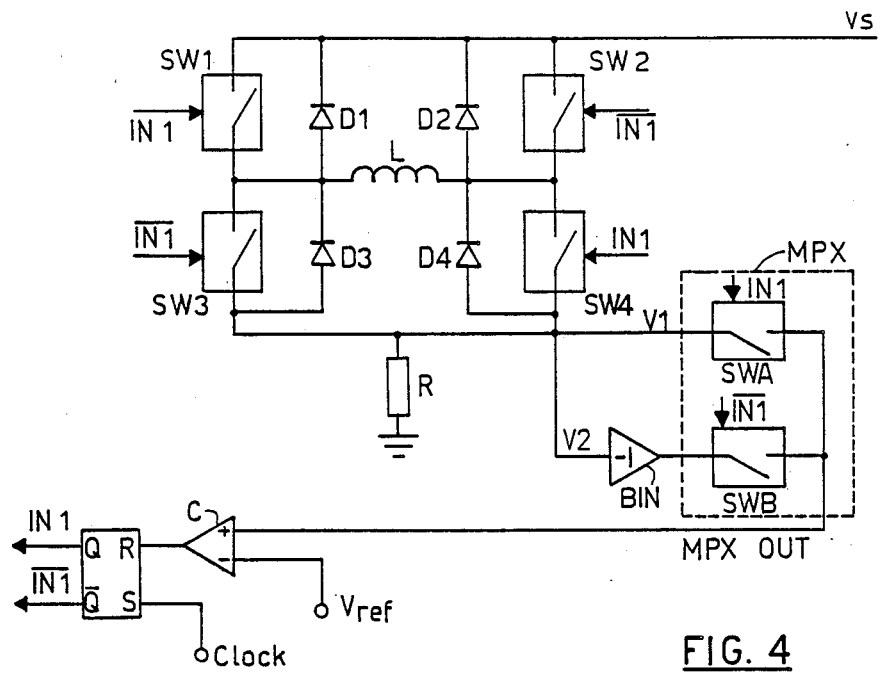
FIG. 4 shows a principal circuit diagram of an H-bridge stage utilizing a circuit for sensing the magnitude and direction of the electric current through the load in accordance with the present invention.

This is what is made possible by the sensing circuit of the present invention which is schematically depicted in FIG. 4. In this figure as well as in the others, the same symbols and numerals are utilized for identifying recurring or equivalent components, common to the circuits shown in the different figures.

As may be observed, the circuit of the invention utilizes a single sensing resistor R connected between a single common virtual ground node (V1) and a real ground node of the circuit. The necessary reconstruction of the complete information of the current delivered to the load L of the bridge stage takes place by means of an analog multiplex (MPX) having two inputs, formed by two switches SWA and SWB) which are respectively driven by the clocked driving signal IN1 and by its inverted signal $\overline{IN1}$, to the inputs of which are applied, respectively, the common virtual ground node's voltage signal (V1 during a first phase) and an inverted signal thereof (V2 during a second phase)

which is obtained by means of an inverting analog buffer BIN. The output signal of the multiplex (MPX OUT) is then fed to the non inverting input (+) of a comparator, to the other (inverting) input (−) of which a control voltage (Vref) is suitably applied.

Figure 5:
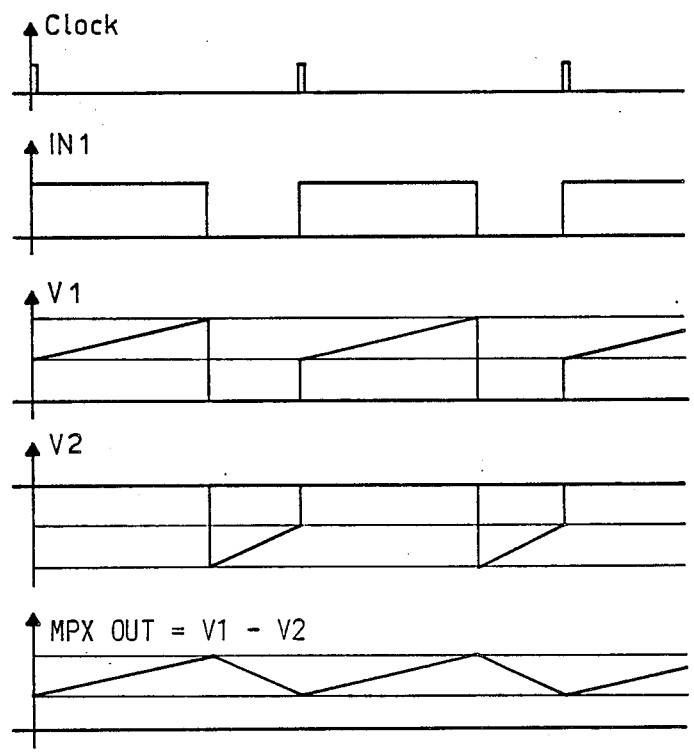
FIG. 5 is a signal diagram representative of the circuit of FIG. 4.

As may be easily observed, once a certain control voltage Vref is set, the output signal of the comparator C will contain the desired information on the magnitude and direction of the electric current flowing through the load L of the H-bridge stage. The amplitude of the output signal of the comparator is proportional to the magnitude of the current while the polarity thereof (in respect to the polarity of the reference or control voltage Vref) is indicative of the direction of the current. This is figuratively shown in FIG. 5 by means of the time diagrams of the different signals representative of the circuit of FIG. 4, as will later be described in more detail.

The PWM control and adjustment loop may be completed in a conventional manner as shown in FIG. 4 by feeding the output signal of the comparator C to an input (R) of a flip-flop Q, to the other input (S) of which a timing clock signal is applied. This allows for inverting or not inverting the sense signal of the monitored current syncronously with the driving signal IN1.

The clock signal, the driving signal I1, the two "phases" of the potential of the common virtual node namely: V1 which is fed directly to one input multiplex MPX and V2 which is inverted by the inverter BIN before being fed to the other input of the multiplex MPX, and the output signal MPX OUT of the multiplex MPX are depicted in the time diagram of FIG. 5.

The amplitude of the MPX OUT signal will be proportional to the magnitude of the current which flows through the load L of the bridge stage, while the polarity of the corresponding output signal of the comparator C will be determined by the polarity of the voltage Vref which is applied to the other input (−) of the comparator C.

Therefore the inversion of the direction of the current flowing through the load is easily implemented by simply inverting the polarity of Vref.

Figure 6:
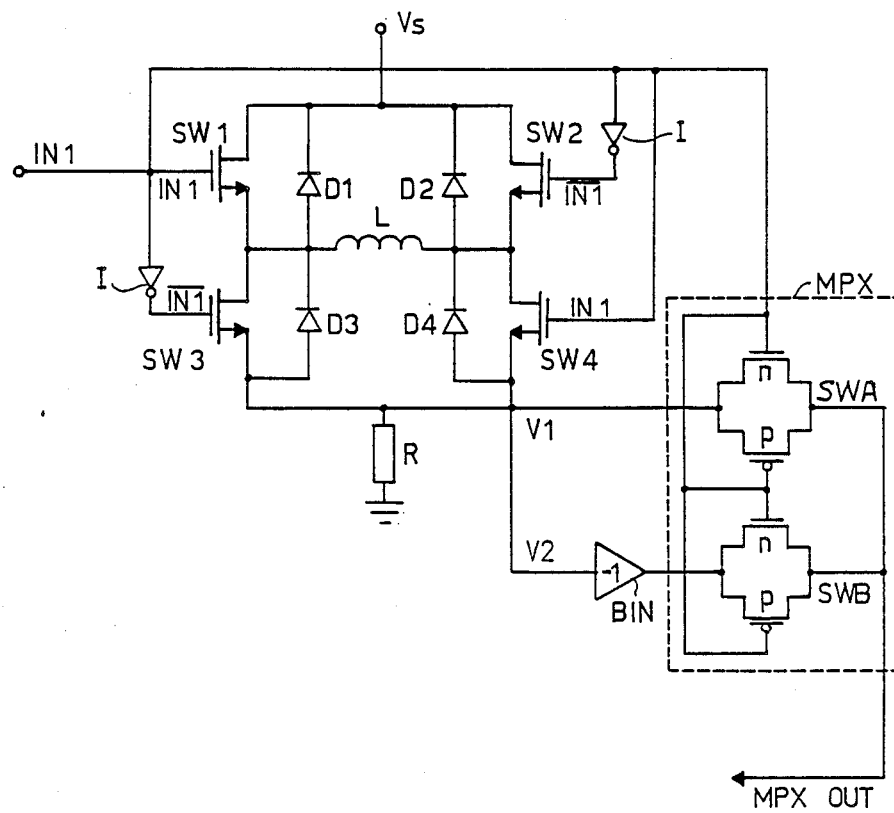
FIG. 6 is a circuit diagram of an embodiment of the circuit of FIG. 4 utilizing analog switches implemented by means of MOS transistors.

The circuit of the invention is particularly advantageous in those applications which contemplate the integration of the H-bridge stage either by means of integrated power bipolar transistors or MOS transistors In these embodiments, the multiplex will be conveniently made by means of two integrated analog switches. Such an integrated circuit is shown in FIG. 6, wherein the power switches of the bridge stage (SW1, SW4 and SW3, SW2) are made with as many power MOS transistors, while the multiplex MPX is formed by two analog switches each being formed by a pair of complementary MOS transistors one with a N-channel and the other with a P-channel), i.e. in CMOS technology.

What we claim is:

1. A circuit for sensing the magnitude and direction of an electric current flowing through a load driven in a switching maode by an H-bridge stage by means of a clocked square-wave driving signal and an inverted driving signal which are applied, respectively, to two pairs of analog switches arranged in an H-bridge configuration and having recirculation diodes connected across said switches, said switches switching the load between a supply node and a virtual ground node of the stage, said circuit comprising:

a single sensing resistor connected between a virtual ground node and a real ground node of the circuit;

an analog, two input, multiplex including two switches driven, respectively, by the driving signal and by the inverted driving signal, the input corresponding to the switch driven by the driving signal being connected to the virtual ground node and the input corresponding to the switch driven by the inverted driving signal being connected to the output of an inverting analog buffer having an input connected to said virtual ground node; and a comparator having two input terminals and an output terminal, the output of said analog multiplex being connected to a first input terminal of said comparator and a reference voltage being applied to a second input terminal of said comparator.

2. The sensing circuit according to claim 1, wherein said multiplex is formed by a pair of analog switches made with MOS transistors.

3. In a combination, H-bridge stage for driving a load in a switching mode by means of a clocked square-wave driving signal and an inverted signal thereof, and circuit means for sensing the magnitude and directions of the electric current flowing through the load, said H-bridge comprising:

two pairs of switches arranged in a bridge configuration for receiving the driving and the inverted signals, respectively, and functionally switching the load between a supply node and a virtual ground node of the bridge stage, and recirculation diodes connected across said switches;

said sensing circuit means including:

a single sensing resistor connected between the virtual ground node and a real ground node of the circuit;

an analog, two input, multiplex having two switches driven, respectively, by the driving signal and by the inverted driving signal, the input corresponding to the switch driven by the driving signal being connected to the virtual ground node and the input corresponding to the switch driven by the inverted driving signal being connected to the output of an inverting analog buffer having an input connected to the virtual ground node; and a comparator having two input terminals and an output terminal, an output of said analog multiplex being connected to a first input terminal of said comparator and a reference voltage being applied to a second input terminal of said comparator.

4. The combination according to claim 3, wherein said multiplex is formed by a pair of analog switches made with MOS transistors.

5. The combination according to claim 3, characterized in that the output terminal of said comparator is connected to an input terminal of a flip-flop, to another input terminal of which a clock signal is applied;

an output signal of said flip-flop constituting said driving signal and the polarity of said reference voltage determining the direction of the current flowing through the load of the bridge stage.

* * * * *